United States Patent [19]
Zimmerman

[11] 3,827,504
[45] Aug. 6, 1974

[54] ROD WEEDER

[76] Inventor: Clarence R. Zimmerman, 6th Ave. and County Rd., Almira, Wash. 99103

[22] Filed: Mar. 21, 1973

[21] Appl. No.: 343,501

[52] U.S. Cl. .................................. 172/44, 172/720
[51] Int. Cl. ............................................. A01b 39/19
[58] Field of Search ............................. 172/44, 720

[56] References Cited
UNITED STATES PATENTS

| | | | |
|---|---|---|---|
| 2,093,070 | 9/1937 | Bloom et al. | 172/44 |
| 2,227,527 | 1/1941 | Wolfe | 172/44 |
| 2,321,537 | 6/1943 | Williams | 172/44 |
| 2,614,475 | 10/1952 | Mowbray | 172/44 |
| 3,749,177 | 7/1973 | Keyser | 172/44 |

*Primary Examiner*—Stephen C. Pellegrino
*Attorney, Agent, or Firm*—Wells, St. John & Roberts

[57] ABSTRACT

A rod weeder for setting a moisture level slightly below ground level and for controlling weeds prior to seeding. The weeder is comprised of a plurality of rectangular rod or helical coil members loosely encircling a wire rope or cable. The cable is held under tension between at least two furrow opening elements of a seed drill or other implement. The rod or coil members are free to rotate on the cable. As the weeder is moved along through the ground, the rod or coil members rotate in a direction corresponding with the direction of travel to compact the soil below and to tear through weed roots.

8 Claims, 8 Drawing Figures

ROD WEEDER

BACKGROUND OF THE INVENTION

The use of rod weeders has gradually progressed from original utilization for controlling weeds in summer fallow to current use in producing a final moisture line slightly beneath the ground surface suitable for seed drilling. Previously the moisture line has been raised progressively from the depth of initial tillage to the final moisture line level by rod weeders whose primary function is to control weeds. These rod weeders invariably are of the variety having an elongated rectangular rod or rods extending across the path of the towing vehicle and powered to rotate in a direction opposite to the forward rolling direction of travel. The purpose of powered rotation of the rod is to engage and pull the roots of weeds upwardly toward the soil surface. A secondary purpose is to pack the soil beneath the weeder rod to define a moisture level. While these weeders have proven effective in controlling weeds, the secondary purpose of packing the soil to form moisture levels, especially at the final level before seeding, is rather inefficient. This is usually true because the weeders are operated as units separate from other implements and the reverse powered rotation of the rods limits its soil compacting ability.

The apparatus disclosed herein comprises a freely rotatable weeder which may be adapted to fit a seed drill, thereby combining the operations of the final setting of the moisture level with sowing. Such a combination not only saves time in soil preparation but also positively insures that the seeds are sown below the final moisture level since the weeder and the seed drill are operated as a single unit.

Although the preferred form of the instant invention is disclosed in combination with a seed drill, it is conceivable that the weeder could be utilized as an individual unit or in combination with other implements.

A further advantage of the present invention is superior soil compaction capabilities over the powered weeders. Since the rods of the present apparatus are freely rotatable, a forward rolling rotation is maintained as it is frictionally moved forwardly through the soil. Such forward rotation of the rods combined with the weight of the machinery above ground serves to control weeds and tightly compact the soil beneath the rods to form a firm seed bed and moisture level.

The weeder comprises a plurality of short lengths of rectangular tubing or in an alternate form, lengths of helical coil members, loosely fitted end to end over a twisted cable or wire rope fastened tightly across or between the furrow openers of a seed drill or other implement. The members both include end portions having circular holes that loosely fit the cable to provide a bearing surface and axis of rotation for the members. The flexibility of the cable and relatively short lengths of the rod or coil members allow the weeder to bend or move under or over obstacles such as large stones without damage.

A search of prior art in the U.S. Pat. Office produced the following listed patents which are thought to be the most pertinent:
U.S. Pat. No. 21,259 to C. F. Bloom
U.S. Pat. No. 1,592,545 to L. C. VanPatten
U.S. Pat. No. 2,227,527 to H. K. Wolfe
U.S. Pat. No. 2,528,270 to L. O. Fundingsland
U.S. Pat. No. 2,699,714 to L. O. Fundingsland
U.S. Pat. No. 2,725,006 to R. W. Richmond.

The C. F. Bloom patent titled "Drive for Rod Weeders" discloses a floating drive mechanism which operates to drive the rods of a rod weeder to rotate in a direction opposite to the forward direction of travel. The rod of this apparatus is constructed of one continuous unit that extends across the width of the weeder frame.

The Van Patten patent also discloses a powered rod weeder wherein the rod is polygonal in cross section and extends as a unit across a supportive framework. The rod is driven by a linkage which transfers rotation of one of the supportive wheels to the rod.

The H. K. Wolfe patent also discloses a driven rod type weeder. A series of worm or auger flights are affixed to the rod and arranged so that when rotated, tend to move material engaged thereby away from the journalled points or spools which rotatably support the rod.

The Fundingsland patents both disclose powered rod weeders, the second (U.S. Pat. No. 2,699,714) of which includes a rod made up of several short lengths loosely held end to end by journals or tubular sleeves. The purpose of this apparatus is to allow a degree of deflection of the rod thereby preventing breakage as the rod strikes large rocks and the like.

The Richmond patent discloses a powered rod weeder which, like the Wolfe apparatus, teaches the use of auger flights as integral parts of the rod. The primary purpose of this invention is to make use of a central drive mechanism for driving the rod at its longitudinal center.

The apparatus of the present invention differs from those cited above first by the fact that all of the above weeders are powered while the present weeder is not. Secondly, the individual or coil rod members of of the present invention are freely rotatable on a relatively stationary core member, thereby not requiring a plurality of journal points which are very susceptible to dirt compaction, rust or other movement inhibiting conditions. Thirdly, the auger flights cited in the above prior art are fixed for powered movement as a unit in response to movement of the weeder wheels, whereas the helical coil weeder members of the second embodiment of the present invention are each independently rotatable with respect to a relatively stationary core member.

SUMMARY OF THE INVENTION

The invention basically combines a length of wire rope and encircling sections of a hollow member. The wire rope, when taut between adjacent tool elements, serves as a rotational support for the coaxial members.

One object is to provide a relatively simple and inexpensive rod weeder attachment readily mounted on a seed drill or other sub-soil tool. It requires no substantial alteration of the tool or of its manner of usage in the field.

Another object is to utilize the free forward rolling movement of the rod or coils for setting an effective moisture level in the ground during seeding or other soil preparation steps.

Other objects will be evident from the following discussion.

DESCRIPTION OF THE PREFERRED AND ALTERNATE EMBODIMENTS

Figure 1:
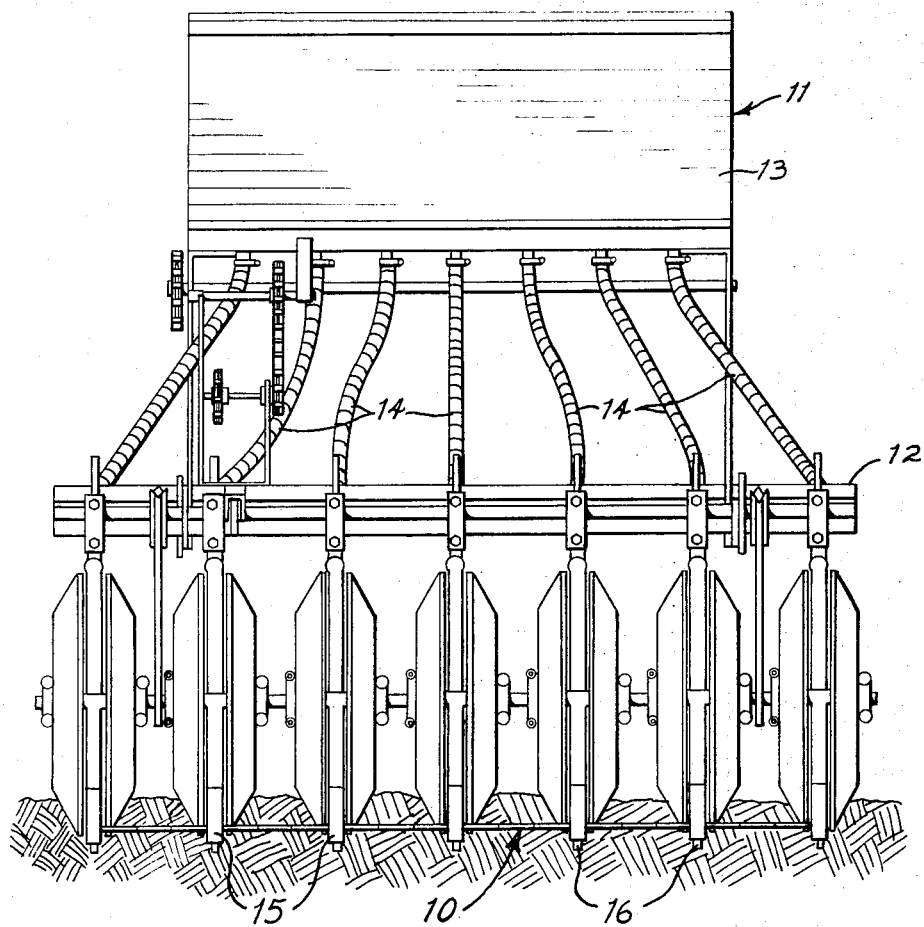
FIG. 1 is a rear elevation view of a seed drill with the present rod weeder attached thereto.
Figure 2:
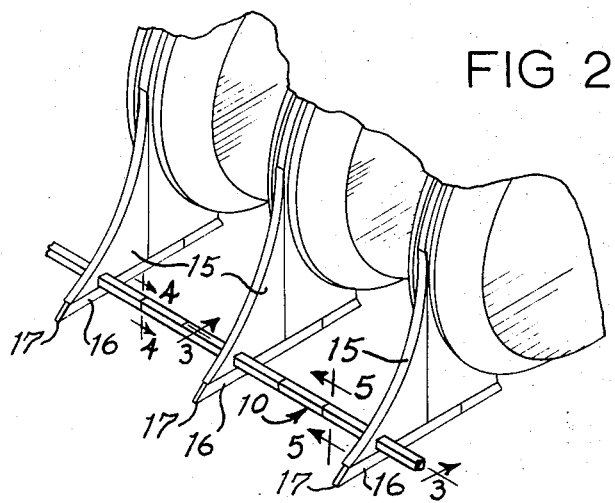
FIG. 2 is a fragmentary frontal isometric view of the weeder and associated elements.

The rod weeder basically comprising the first form of the instant invention (FIGS. 1-5) is indicated in the drawings by the reference numeral 10. The illustrated weeder 10 is mounted to a seed drill implement 11 similar to that disclosed by my U.S. Pat. Nos.: 3,319,590 and 3,172,368. It should be noted however, that the use of weeder 10 is not intended to be restricted to combination with such implements and that it can also be utilized as an individual weeder unit or mounted in combination with other implements, such as the cultivator shown in FIG. 6.

Referring now to FIG. 1 of the drawings, a seed drill 11 may be seen comprising a supporting framework 12 mounting a seed hopper 13. Seeds are distributed from the hopper through a plurality of depending seed tubes 14 to an equal number of furrow opener elements 15. Elements 15 are transversely spaced across the path of travel of the drill.

The furrow opening elements include integral lower trenching blades 16 (FIG. 2) behind which the seeds are deposited into the soil as the drill moves along. Trenching blades 16 extend from forward pointed tips 17 of the opener elements 15 rearwardly to seed deposit openings (not shown). The rod weeder 10 of the present invention is mounted transverse to the path of the drill 11 by the opener elements 15 at locations longitudinally between and elevationally above the tips 17 and respective seed openings.

Figure 3:
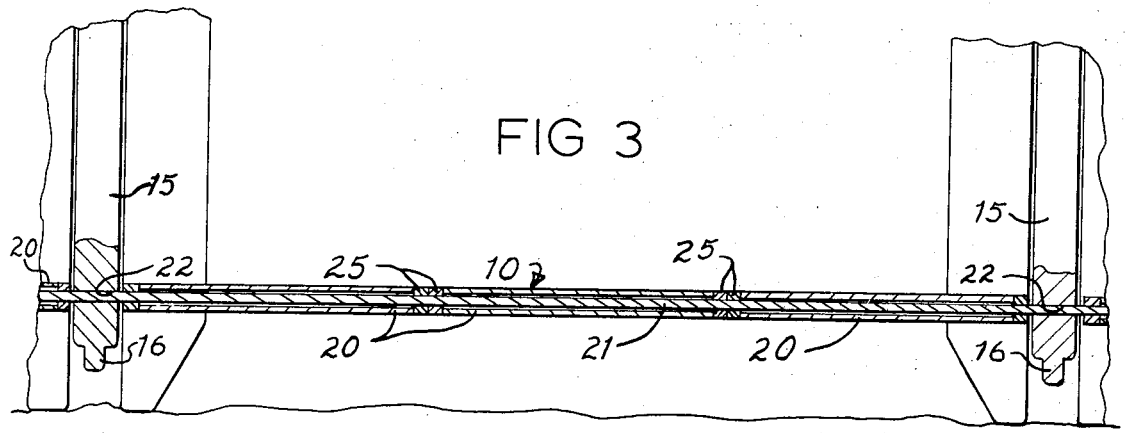
FIG. 3 is an enlarged sectional view taken along 3—3 in FIG. 2.
Figure 4:
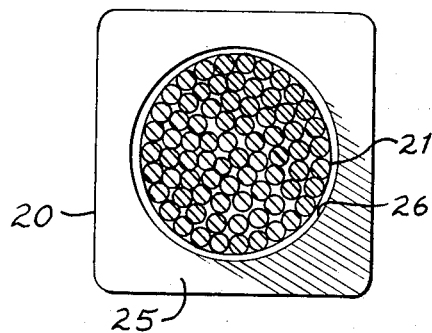
FIG. 4 is an enlarged sectional view taken along line 4—4 in FIG. 2.
Figure 5:
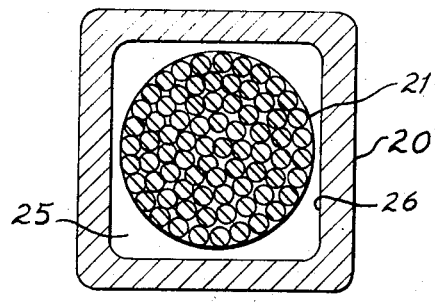
FIG. 5 is an enlarged sectional view taken along line 5—5 in FIG. 2.

The rod weeder 10 may best be seen with reference to FIGS. 3-5. A section of the weeder 10 is shown in FIG. 3 extending between two adjacent furrow opening elements 15. The section illustrated is typical for all weeder sections between opening elements 15 except the end elements where the ends of the weeder are fastened in a fixed manner by conventional wire rope shackles (not shown).

The weeder is comprised of a plurality of elongated hollow tubular members in the form of rod sections 20 rotatably held on conventional wire rope 21. The axial twist of the wire rope strands constitutes an important feature of my invention which will be disclosed in greater detail below. The rope or cable 21 extends transversely across the drill between the outer furrow opening elements through aligned transverse holes 22 in the intermediate furrow opening elements 15.

Three rod sections 20 are illustrated in FIG. 3 loosely mounted, end to end, on the cable 21. The sections are tubular and typically square in cross section as shown in FIG. 5, with the corners slightly rounded. Each section, however, includes partially enclosed end portions 25 which include circular openings 26. Openings 26 are coaxial, with diameters slightly larger than that of the cable 21, thereby constituting a bearing means which allows free rotational movement of the rod sections on the cable with the inwardly facing circular walls of the openings 26 acting as bearing surfaces.

The loose fit of the rod sections 20 on cable 21 enables soil to enter the inner, open portions of the sections during operation. The twisted strands of the cable, however, serve as an auger, moving the soil out of the sections as they rotate. This constitutes an important feature of my invention, in that it assures constant freedom of rotation for the rod sections 20. Such rotation is necessary to effectively control weeds, to prevent buildup of trash on the rod sections and further to facilitate compacting of soil engaged thereby. If necessary, means could be provided to reciprocate cable 21 axially relative to rod sections 20 for further cleaning purposes.

Rotation of the rod sections 20 is initiated, as the drill is moved along, by the weight of the drill and friction against the ground below. It may be understood then that the direction of rotation of the sections 20 will always correspond with the direction of forward rolling travel of the drill 11. Each section turns independently of the others to meet specific soil conditions encountered along its length.

In operation, the rod sections 20 are held underground at a desired level by the furrow opening elements 15 as shown in FIG. 1. The elements 15 may be selectively lowered or raised to adjust the seed depth between the operative position shown in FIG. 1 and the transport position shown in FIG. 3. Further details of the elements and operation of drill 11 may be obtained by reference to the U.S. patents cited above.

As the drill is moved along, the forward rotation or rolling motion of the rod sections compacts the engaged soil as the leading flat side walls of the sections roll constantly forward and downwardly.

The relatively short length of the sections 20 combined with the flexibility of the cable 21 comprise an additional important feature of my invention. This combination presents a substantial degree of flexibility in the weeder 10 thereby allowing it to easily roll over stones or the like without damage to the sections 20 or cable 21. The short sections 20 also facilitate inexpensive replacement.

Figure 6:
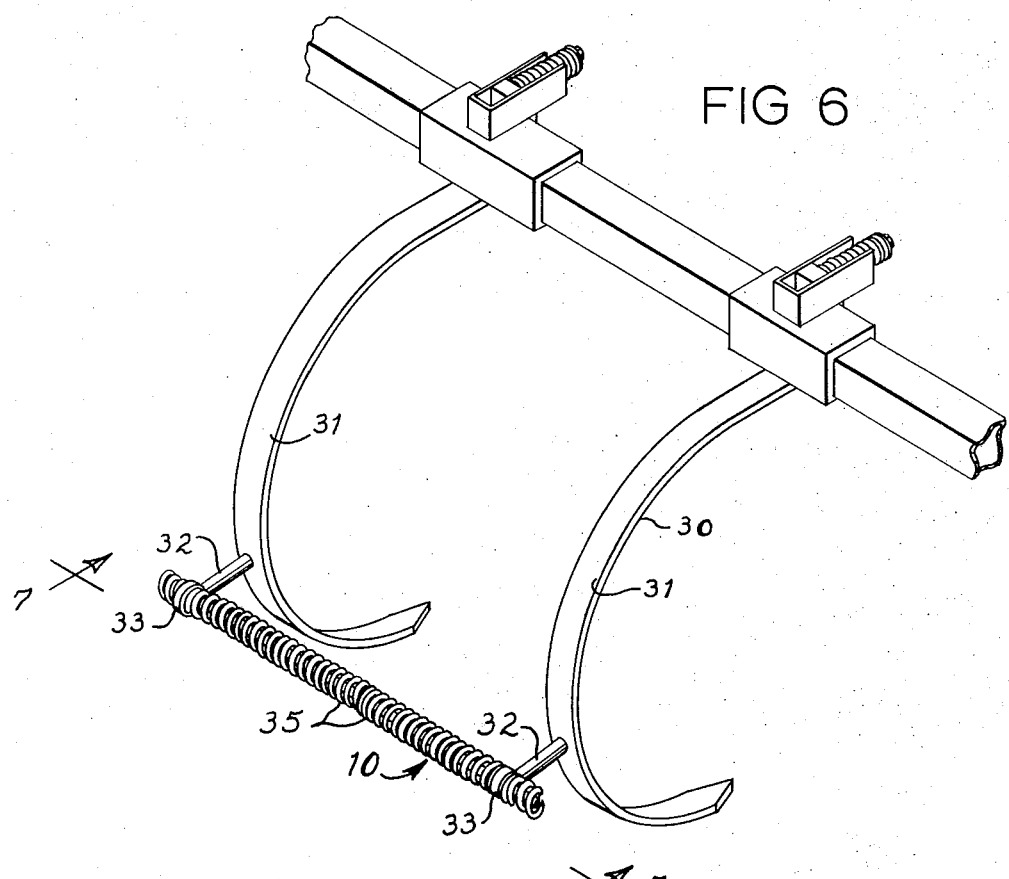
FIG. 6 is a pictorial view of an alternate form of the invention mounted to a cultivator.
Figure 7:
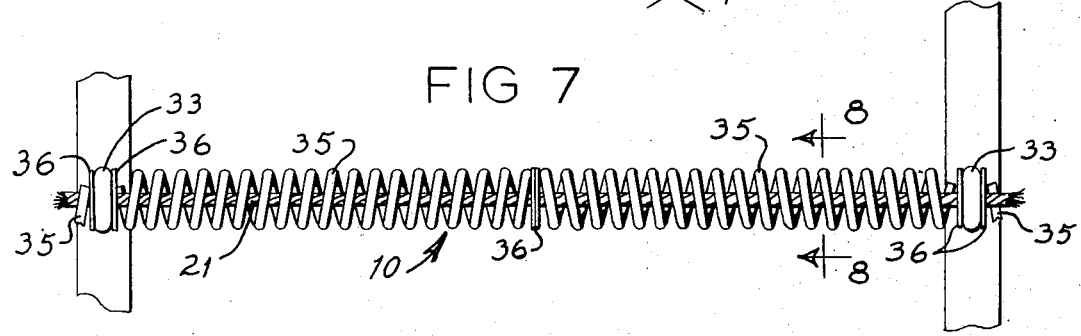
FIG. 7 is an enlarged fragmentary view taken substantially along line 7—7 in FIG. 6.
Figure 8:
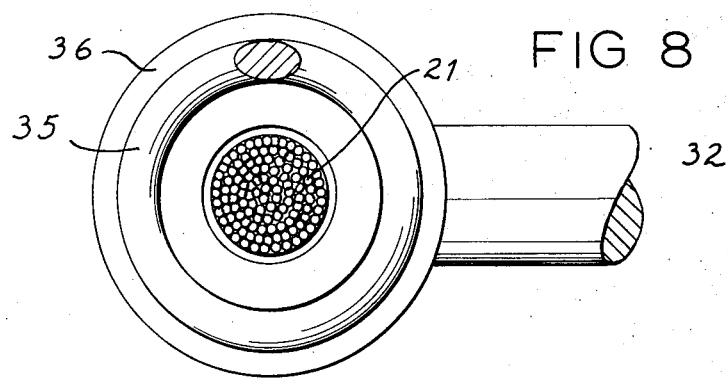
FIG. 8 is an enlarged cross sectional view taken along line 8—8 in FIG. 7.

The second form of the invention is illustrated in FIGS. 6, 7 and 8 mounted to a cultivator which is shown generally at 30. It may again be noted that this form as well as the form described above may be interchangeably used with either the cultivator 30 or the seed drill 11 or equally as easily with various other implements not described.

In this embodiment, the rod members are comprised of helical coils 35 loosely encircling the cable 21 between tines 31 of the cultivator 30.

The cable 21 is supported in a taut, transverse orientation between eyelets 33 which are integral parts of rigid extensions 32 on each tine 31.

Two coils 35 are mounted between each adjacent pair of tines 31 and spiral outwardly therefrom toward a point midway between the tines (FIG. 7). Thus as the coils rotate, the windings of the respective coils 35 direct or urge any material engaged thereby away from the tines 31. To insure free independent rotation of each coil member, flat washers 36 are placed adjacent each coil end.

By arranging the coils as described, trash or other buildup that normally accumulates on the tines is carried away by the auger action of the coils as they rotate — as do the rods 20 of the first-described form — by frictional contact with the ground, and in response to forward movement of the cultivator.

A distinct advantage of using open coil members is that small weed roots and the like may become wedged between the inside bearing surface of the coil and the cable 21. As the cultivator or drill continues to move the weed is either pulled completely or the roots are torn badly enough to kill the plant.

A further advantage in utilizing coils 35 is that the windings are loosely enough to prevent dirt or other material from compacting between the coil and cable and thereby prevent free rotation of the coils.

It may become obvious from the above description and attached drawings that vrious changes may be made therein. It is for this reason that only the following claims are intended to define the invention.

What I claim is:

1. In a farm implement of the type having:
a supporting framework adapted to be towed by a draft vehicle;
a plurality of earth engaging elements mounted in pairs to said framework and transversely spaced across the path of said draft vehicle for selectively penetrating the ground at a desired depth, thereby forming elongated furrows in the soil as the draft vehicle moves along;
and a transverse rod mechanism extending between each pair of said earth engaging elements at an operative sub-soil elevation as determined by said earth engaging elements;
an improvement in the rod mechanism between each pair of earth engaging elements comprising:
a flexible cable affixed to and held taut between said earth engaging elements along a transverse axis; and
a plurality of elongated longitudinally hollow rod members freely rotatably mounted to said cable between said earth engaging elements and having rotational axes coaxial with said transverse axis, thereby allowing the cable to flex between said earth engaging elements also allowing free rotation of the individual hollow members thereon.

2. The implement defined in claim 1 further comprising a bearing means within each of said members for allowing free rotational movement of the members about said transverse axis.

3. The implement defined in claim 2 wherein said cable is formed of a twisted wire rope extending along said transverse axis between said earth engaging elements.

4. The implement defined in claim 1 wherein the outer surfaces of said rod members have a constant polygonal cross-sectional configuration throughout their respective lengths.

5. The implement defined in claim 4 wherein the cross-sectional outer surface configuration of each member is square.

6. The implement defined in claim 3 wherein the members are circular in cross sectional outer surface configuration and are comprised of helical coils expanded along the axis of the circular cross-section.

7. The implement defined in claim 6 wherein two coils are oriented end to end on the wire rope between successive earth engaging elements with the helical coils of each oppositely spiraling away from an adjacent earth engaging element to facilitate movement of material engaged thereby away from the adjacent elements.

8. A rod weeder for use in combination with transversely spaced sub-soil farm implement tooks, comprising:
a length of flexible wire rope adapted to be fixed in a taut condition between the tools along a transverse axis;
and a plurality of hollow rod members of polygonal cross-section adapted to be mounted about the wire rope between adjacent tools for free rotation relative to the wire rope about said transverse axis, and for flexing with the wire rope upon engagement with solid objects, such as rocks, as the tools are moved through the earth;
wherein the rod members include coaxial interior circular bearing surfaces adapted to engage the wire rope to facilitate free coaxial rotation of the individual rod members relative to one another about said transverse axis;
and wherein said rod members include a total length spanning the distance between adjacent tools when mounted coaxially end to end along the wire rope.

* * * * *